United States Patent [19]
Mayer

[11] 3,805,351
[45] Apr. 23, 1974

[54] MILLING TOOL ASSEMBLY
[75] Inventor: Kurt Mayer, Tubingen, Germany
[73] Assignee: Firma Montanwerke Walter GmbH, Turbingen, Germany
[22] Filed: Dec. 18, 1972
[21] Appl. No.: 315,927

[30] Foreign Application Priority Data
Dec. 24, 1971 Germany.......................... 2164496

[52] U.S. Cl. ................................. 29/105 R, 29/96
[51] Int. Cl. ........................... B26d 1/00, B26d 1/12
[58] Field of Search .............. 29/96, 97, 105, 105 A

[56] References Cited
UNITED STATES PATENTS

| | | | |
|---|---|---|---|
| 3,341,919 | 9/1967 | Lovendahl | 29/96 |
| 3,173,191 | 3/1965 | Alexander et al. | 29/96 |
| 3,284,874 | 11/1966 | Green et al. | 29/96 |
| 3,341,923 | 9/1967 | Kelm | 29/96 |
| 3,320,654 | 5/1967 | Lovendahl | 29/96 |
| 3,343,431 | 9/1967 | Boyer | 29/96 X |

Primary Examiner—Harrison L. Hinson
Attorney, Agent, or Firm—Flynn & Frishauf

[57] ABSTRACT

Reversible perforated cutter plates, bits or inserts are mounted in notches around the periphery of a rotary tool body by means of threaded gripping members adapted to clamp the cutter flat against the seating surface and tight against edge positioning surfaces when the clamping member is screwed into the tool body. The tapped bore into which the clamping member is screwed is inclined at an angle in the direction of the axis of the perforation of the cutter plate when the latter is seated on the seating surface, the angle being chosen to provide components of gripping force holding the cutter plate against the seating and positioning surfaces. The engagement of the gripping surface of the clamping member with the wall of the cutter plate hole is such that only a fraction of a turn of the clamping member is sufficient to tighten or release the cutter.

12 Claims, 8 Drawing Figures

MILLING TOOL ASSEMBLY

This invention relates to milling tool of the kind having a number of replaceable cutter plates mounted on the periphery of a rotatable milling tool body. The cutter plates are mounted by fastening means passing through a central perforation in the plate and the plates may be square in outline so that they may be turned and remounted to present new edges as well as turned over to present a whole new set of edges. The cutter plates are tightened by a releaseable gripping element against a suitably oriented seating surface and to lateral edge positioning surfaces, the gripping element engaging the hole of the cutter plate and being of essentially cylindrical form and threaded for screwing into a tapped recess in the rotary body.

In one known form of such milling tool the cutter plates have their central bore countersunk on one or on both sides in which a gripping element in the form of a threaded pin engages a correspondingly formed frusto-conical screw head. The axis of the threaded pin runs at right angles to the seating surface of the cutter plate, and the tightening of the cutter plate into position is accomplished with a positive locking action. To replace one of the cutter plates, it is necessary to remove the pin from the tool body by unscrewing it all the way, which in view of the thread length necessary for tightly securing the cutter is relatively inconvenient and time consuming.

Simpler gripping engagements are involved in other known forms of milling cutters, for example those shown in British Pat. Nos. 1,117,199 and 1,164,147, in which a substantially cylindrical gripping element for an individual cutter plate is provided with an eccentric stud which engages the cylindrical bore of the cutter plate and tightens the cutter plate against the lateral edge positioning surfaces of the cutter body when the gripping element is turned. Since the axis of the gripping element, however, is directed perpendicular to the seating surface of the cutter plate provided on the tool body, when the gripping fastener is tightened, there is no component of force directed towards the seating surface exerted against the cutter plate. Thus it cannot be assured that the cutter plate in its tightened condition is seated flush on the seating surface.

Other forms of milling cutters, for example those described in German Offenlegungsschrift No. 1,552,308 and in U.S. Pat. No. 1,143,310, allow the tightening of the gripping element to exert upon the cutter plate components of force directed towards the seating surface provided on the tool body. In this case gripping elements having a threaded extension are provided with a conical surface which engages, when the gripping pin is tightened, an interior conical surface of the tool body which is eccentrically located with respect to the conical surface of the gripping element. The cooperation of the two conical surfaces cause the gripping element to be elastically deformed to a certain extent and to be canted with respect to the axis of the hole of the cutter plate in which its gripping portion is engaged. The latter portion is either itself frusto-conical in shape, in which case the hole of the cutter plate is then conically counter sunk, or else is cylindrical, in which case the corresponding bore of the cutter plate is likewise cylindrical. It is not inconceivable that in particular cases the gripping pin might elastically snap off as the result of tightening, while on the other hand, the magnitude of the force components applied in the direction of the seating surface to the cutter that can be obtained in this manner are limited to a relatively small value.

Finally still other milling tool constructions have been disclosed, for example in British Pat. Nos. 1,160,138 and 1,167,347, in which the gripping of the perforated cutter plate is produced with a two-part gripping element, of which one of the parts is in the form of a stud engaging the perforation which cooperates with a separate shaft portion provided with a screw thread. Such two-part gripping elements are relatively expensive and are therefore to be avoided if possible. Furthermore, construction disclosed in British Pat. No. 1,167,347, is such that the gripping portion engaging into the bore of the cutter plate has a spherical surface by which it is braced against a corresponding surface of the tool body, which results in a canting of this part when the shaft part is tightened. This special construction imposes the limitation, however, that it is not possible to produce a component of the gripping force directed against the seating surface. Such a component is in effect provided in the form of construction disclosed in British Pat. No. 1,160,138, in which a stud-like part with a cylindrical socket portion is inserted in a freely rotatable and displaceable manner, into a substantially cylindrical shaft portion, in which case the axis of the stud portion makes an angle with the shaft portion of the gripping element that deviates from 180°. When the device is tightened there is produced in this case a friction locking or clamping effect between the shaft portion and the stud portion as well as between the stud portion and the inner wall of the cutter plate hole. In this case the stud portion goes through a wobbling movement during tightening, which has the result that the position of the pressure location on the hole wall in the cutter plate which is produced when the latter is tightened, is uncertain and dependent on variations within the unavoidable production tolerances, so that the magnitude and distribution of the gripping force components directed towards the edge positioning surfaces are unpredictable.

Proceeding from the above-described state of the art, the object of this invention is to provide a milling tool of the general class or type first set forth above in which the gripping of the cutter plate in precise position against the seating surface and the edge positioning surfaces of the tool body can be effected with simple means by a brief manipulation of the corresponding gripping element without any necessity, in the case of replacement of a cutter plate, to unscrew the gripping element entirely out of the tool body or even to loosen it with more than a single complete turn.

Subject Matter of the Present Invention

Briefly, each gripping element is screwed into the tool body in a direction deviating from the axial direction of the perforation of the corresponding cutter plate and inclined at an angle less than 90° as viewed perpendicularly to the seating surface for the cutter plate in the tool body, to at least one of the positioning surfaces of the tool body provided for positioning the cutter plate. These positioning surfaces may engage substantial edge area of the cutter plate or merely hold or restrain the cutter edge of a single point or other restrictive location of the edge. The gripping elements are formed in one piece and are provided with a curved gripping surface on at least a portion of their periphery which follows the curvature of the interior surface of the hole of the cutter plate and which is adapted to engage the hole wall of the cutter plate at a particular pressure position limited or defined in the circumferential dimension of the hole.

In order that the cutter plate may be gripped against both of the positioning surfaces normally provided for positioning the cutter, it is possible in many embodiments advantageously to fashion the device so that the gripping element is screwed into the tool body in a direction which is inclined at an angle less than 90° to both positioning surfaces provided for the positioning of the cutter plate.

As the result of directing the substantially cylindrical gripping element basically tilted with respect to the extension of the axis of the cutter hole when the cutter plate is seated on its seating surface, it is possible to obtain a suitable magnitude of the gripping force components directed against the positioning surfaces and against the seating surface respectively by a suitable choice of the angular direction of the bore in which the gripping element is screwed in. In addition this makes possible the loosening of the gripping element with only a small unscrewing movement to release the cutter plate, while at the same time in the tightened position an unusually secure and precise gripping force is provided. The pressure location at which the gripping surface acts against the hole surface is limited to a small area, so that a high gripping force may be obtained.

The gripping surface of the gripping element can advantageously be a conical surface, so that in the region of the pressure site a straight line of engagement against the hole wall is produced. Then, because only a fraction of a turn is necessary as a rule to release or to tighten the gripping element, forms of construction are possible in which the gripping surface of the gripping or clamping element is only a limited segment of a conical surface limited to a moderate number of degrees of arc.

One advantageous embodiment of the invention is that the gripping element consists of a substantially cylindrical shaft portion adapted to be screwed into the tool body on which is provided at one end a gripping head on the periphery of which the gripping surface is formed. The gripping head can be connected to the shaft portion by means of a neck portion of smaller diameter, so that the diameter of the gripping head and that of the shaft portion may be optimally dimensioned in relation to the diameter of the cutter plate hole and the fastening firmness requirements for the shaft portion, without any disturbing interference being produced by the hole wall on the cutter plate. It is convenient and effective to provide a socket, stud or other engagement surface for engaging a tightening tool, for example for engaging a hexagonal key or socket wrench, but the design can also be made such that surfaces for engaging a tightening tool are provided in the region of the outer end of the shaft portion of the clamping element.

In order to reduce still further the necessary angle of twist for tightening the gripping element and to increase the gripping force components directed towards the positioning surfaces, the center of curvature of the gripping surface of the gripping element may be located eccentrically with respect to the longitudinal axis of the gripping element. The gripping head of the clamping element is usefully provided with circular cross-sectional symmetry, in which case its maximum diameter is less than the diameter of the corresponding cutter plate hole. In addition, the gripping head may carry an extension beyond the portion bearing the gripping surface in the axial direction having at least a portion of smaller diameter in which the provision for engaging a tightening tool is formed.

The invention will be described by way of example with reference to the accompanying drawings, wherein.

Figure 4:
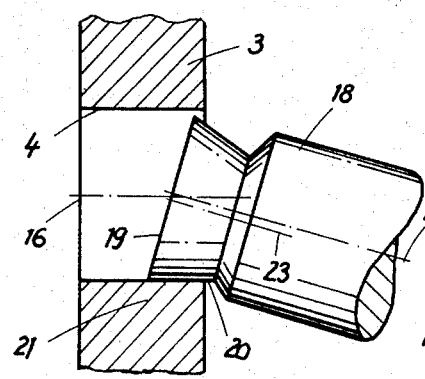
Figure 5:
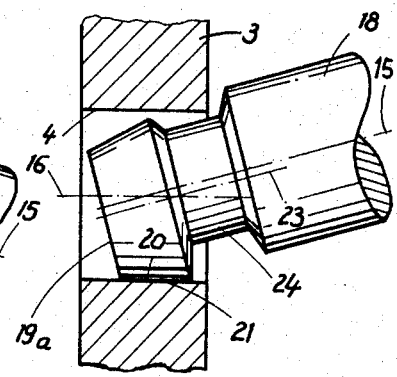
Figure 6:
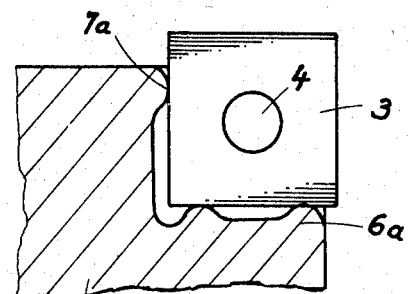
Figure 7:
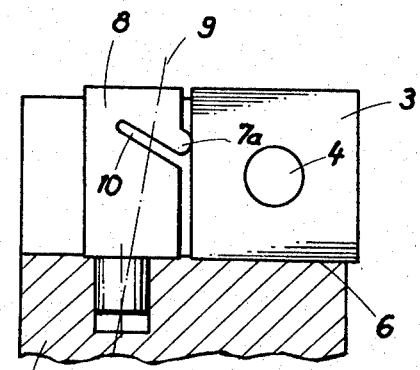
Figure 8:
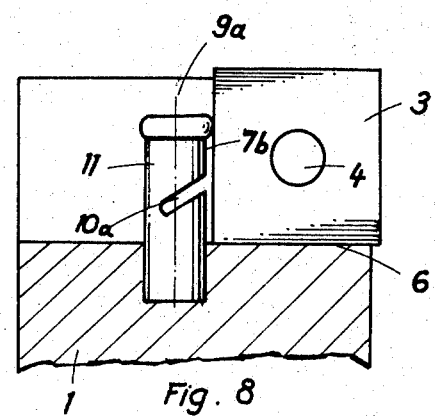

FIGS. 4 and 5 are two different forms of construction of gripping elements for milling cutters in accordance with the invention, in each case shown in relation to a cutter plate, in side view, partly broken away, the cutter plate being shown in axial section, and FIGS. 6, 7 and 8 are different forms of construction of milling tools in accordance with the invention, with the tool body shown in section with a view being in each case in the direction shown by the arrow A of FIG. 2, so that the cutter plate is seen in plan view on a scale differing from that of FIG. 2, the tool body again being broken away.

Figure 1:
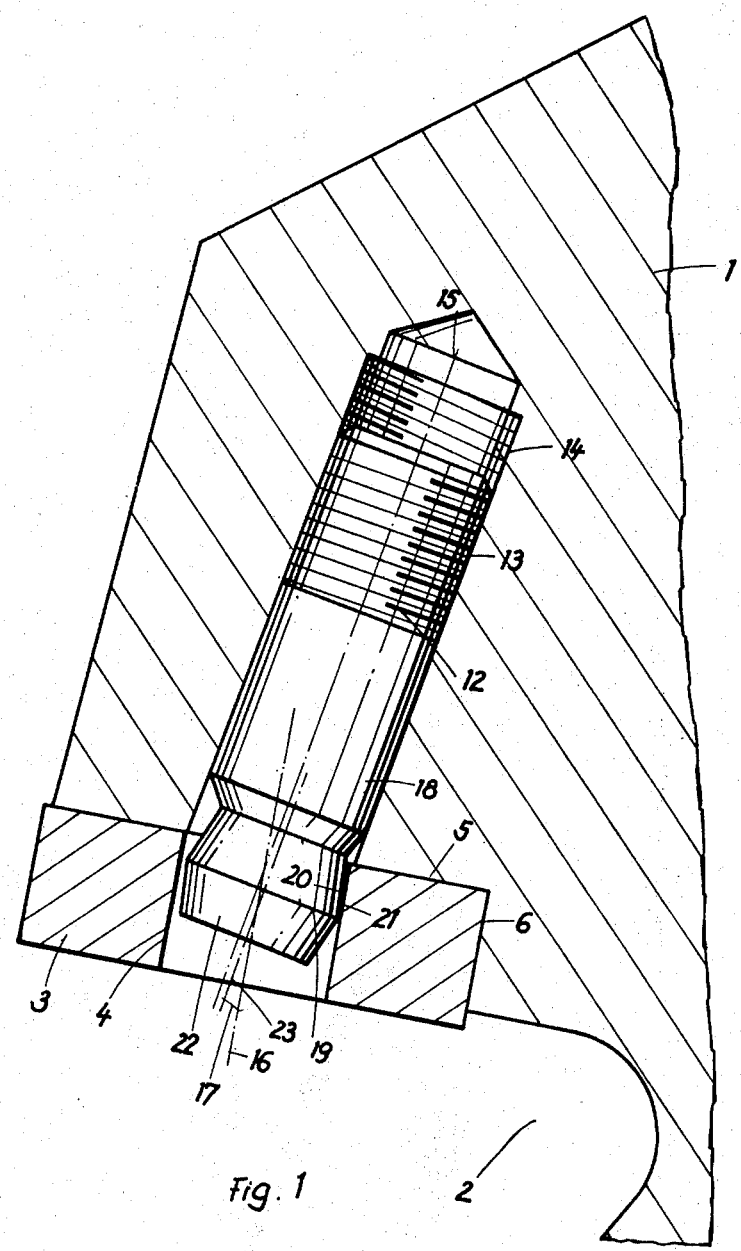
FIG. 1 is a axial section providing a side view, partly broken away, of a milling tool according to the invention.
Figure 2:
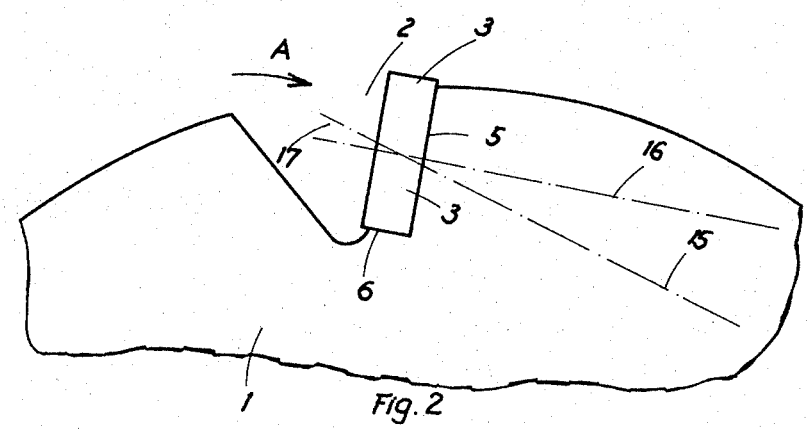
FIG. 2 is a side view, partly broken away, on another scale, of the milling tool of FIG. 1.
Figure 3:
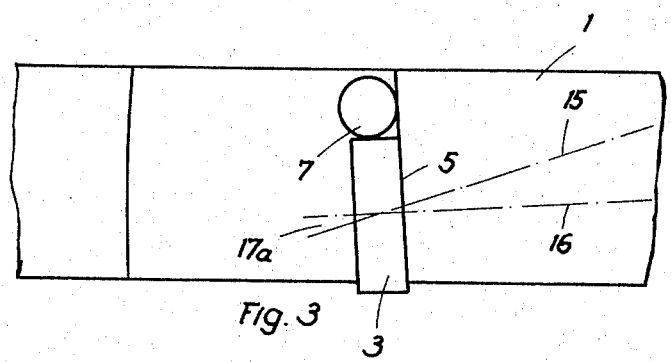
FIG. 3 is a top plan view of the milling tool shown in FIG. 2.

The milling tool shown in various views in FIGS. 1, 2, and 3, in each case the view being broken off so that just a single cutter and the surrounding portion of the periphery of the rotary tool body are shown, illustrate a cut-out portion 2, which has the form of a transverse groove interrupting the periphery of the tool body 1, in which the cutter plate or chip, or bit, or insert 3 is set. The cutter plate 3 is made of a hard metallic material and is provided with a central hole going right through it, which serves to clamp the cutter plate in position in the manner described below.

Each of the cutter plates 3, which are distributed around the periphery of the tool body 1 although only one of them is shown in FIGS. 1–3, lies broadside against seating surface 5 in the tool body 1 on the side of the groove facing the direction of circumferential motion of the tool body, hence the rear or advancing side of the groove. The cutter chip is, in addition, held fast against two positioning surfaces 6 and 7. The positioning surface 6 in this case is part of the bottom of the groove and engages one edge of the cutter along almost all of its length with an area contact, while the positioning surface 7 in the construction shown in FIG. 3 is provided by a cylindrical stud which may make only a line contact the edge of the cutter 3 or, preferably, is of the construction shown in FIG. 8 with a projecting cap so that essentially only a point contact with the cutter 3 is provided. The stud bearing the positioning surface 7 is set into the tool body 1 and is held very precisely in its prescribed position.

Instead of the continuous plane positioning surface 6 (FIGS. 2, 7, 8) there could be used instead two spaced and separate positioning surfaces 6a each making a point contact, as may be seen from FIG. 6, while the positioning surface 7 can be provided either in the form of a projection or boss 7a (FIG. 6) or by a surface providing an extended contact. The projection 7a serving as a positioning surface in FIG. 6, furthermore, does not need to be formed integral with the tool body 1; it can be provided as a separate stop piece 8, that may either have the form shown in FIG. 7 or else some other form, of which many are known. In the stop piece 8 as shown in FIG. 7, tightening a clamping screw indicated at 9 the distort a slit 10 by bending taking place about its root in such a way that the positioning surface 7a has a certain adjustment range for setting a particularly desired position of the positioning surface 7a. In the case of the form of construction shown in FIG. 8 the stop piece 11 has a cylindrical form with a corresponding slit 10a, which allows the adjustment of the positioning surface 7b by tilting the upper part of the stop piece by means of the clamping screw indicated at 9a.

The clamping of the cutter plates 3 is accomplished with gripping elements such as are shown in FIGS. 1,4 and 5. Each of the one-piece gripping elements 12 of basically cylindrical form is provided with a threaded extension 13 adapted to be screwed into a tapped hole in the tool body opening into the seating surface 5 of that body. The axial direction 15 of the bored hole 14, and hence that of the gripping element 12, is inclined to the direction of the axis 16 of the hole 4 through the cutter plate 3 seated flush on the seating surface 5 and held against the positioning surface 6 and 7,7a or 7b, as the case may be and its inclination is such that it make an angle smaller than 90°, as viewed perpendicularly to the seating surface 5, with the positioning surfaces 6 or 7 or 7a,7b as may be seen from FIGS. 1–3, in which the angle between the axis 15 of the gripping element 12 and the axis 16 of the hole 4 of cutter plate 3 is indicated in the various planes by 17 or 17a.

As the result of this skewed arrangement of the two axes 15,16 with respect to each other, gripping force components are produced which urge the cutter plate 3 against the positioning surfaces 6,7,7a,7b. In the form shown in FIGS. 1 and 4 the gripping element 12 has a cylindrical shaft portion 18 connected with a gripping head 19 which carries a conical gripping surface 20 on its periphery. The arrangement is so disposed that the gripping head 19 has circular symmetry in cross-section and its maximum diameter is smaller than the diameter of the hole 4 through cutter plate 3. The gripping surface 20 is, as shown, angled to follow the inner surface of the hole 4; it lies against the inward facing wall of the hole 4 of the cutter plate at a pressure site indicated at 21, of a surface extent narrowly limited in the circumferential dimension of the hole, that is, it does not extend over the entire circumference of the hole.

The provision of the gripping surface 20 in conical shape has the result that the gripping surface in the neighborhood of the pressure site 21 has a straight generatrix line running at least approximately parallel to the generatrix line of the inside wall of the hole 4 passing through the pressure site 21. Both cylindrical and conical surfaces have the property that they can be generated by revolving a straight line in a suitable fashion and for every point on the surface a generatrix line passing through the point can be drawn.

In the form of construction shown in FIG. 1 the gripping head 19 has a region 22 of smaller diameter annexed to the portion which bears the gripping surface 20. This region of smaller diameter is of frusto-conical shape and contains a depression of hexagonal contour not shown in the drawing, for the purpose of engaging a tightening tool. The device could also be so fashioned that the cylindrical shaft portion 12 would be provided with comparable engagement surfaces in the region of its free end, in which case the bore 14 is then continued into and through the tool body to an orifice (not shown) through which a tightening tool may be inserted.

The center of curvature of the gripping surface 20 of clamping element 12 in the form of construction shown in the drawings is placed eccentrically with respect to the longitudinal axis 15 of the clamping element 12, as is made clear by the position of the axis 23 of the gripping head 19 shown in FIGS. 4 and 5.

While the form of construction shown in FIGS. 1 and 4 is such that the essentially frusto-conical gripping head 19 is connected to the cylindrical shaft portion 18 at its end surface having the smaller diameter, in the case of the form shown in FIG. 5 the gripping head 19a has the reverse arrangement, that is, it has its end surface with the larger diameter facing the cylindrical shaft portion 18. In this case the gripping head 19a is connected to the cylindrical shaft portion 18 by a neck portion 24 of smaller diameter which prevents interference of the edge of the hole 4 of the cutter plate 3 with the gripping member.

The tightening of a cutter plate 3 is accomplished in the following manner:

The gripping element 12 is first screwed into the tapped hole 14 in the tool body 1 to an extent that allows its gripping head 19 to project from the hole to a certain extent as shown in FIG. 1. The cutter plate 3 is then applied with its hole 4 fitting around the projecting clamping head 19, so that the head 19 lies with its gripping surface 20 inside the hole 4. The gripping element 12 is then tightened by turning in the direction for screwing it further into the tool body by means of a tightening tool such as a hexagonal wrench engaging a suitable socket. As this is done the gripping surface 20 comes into contact with the inside wall of the hole 4 due to the skewed arrangement of the axis 15 of the gripping element 12 with reference to the axis 16 of the hole 4, so that with continued rotation the gripping element presses the cutter plate against the positioning surfaces 6,7,7a,7b, as the case may be and tightens the assembly. Since by this tightening operation the gripping element 12 at the same time is screwed into the tool body 1, a force is also exerted against the cutter plate 3 which is directed towards the seating surface 5, so that the cutter plate is pressed flush against the seating surface 5.

Since the gripping surface 20 in the form of construction corresponding to FIGS. 1 and 4 is arranged eccentrically with respect to the axis 15 of the gripping element 12, the tightening down of the cutter plate 3 is performed with only a fraction of a turn of the gripping element 12. It is therefore not necessary as a rule for the gripping surface 20 to extend all the way around the clamping head 19; on the contrary it is sufficient to provide a limited segment of a conical surface, shortened in the circumferential direction, for the gripping surface.

It should finally be mentioned that forms of construction are also conceivable in which instead of a gripping surface formed in conical shape a cylindrical surface or a surface of another shape, for example a a spheroidal or other crowned shape, might be used. In addition, the concept of this invention is applicable to fastening cutter bodies having a perforation to a tool body even when the cutter bodies are not of the reversible cutter plate type.

The cylindrical shaft portion 18 serves to guide the gripping element 12 in the bore 14. Forms of construction are also possible in which the gripping head 19 or the neck portion 24 (FIG. 5), as the case may be, is directly affixed to the threaded portion.

The hole 4 of the cutter plate 3 is of cylindrical form in the examples here illustrated. The concept of the invention is, however, applicable to cutters in the form of plates and other kinds of holes, for example holes countersunk on one or both sides or conical or biconical holes. The gripping surface 20, furthermore, can be provided in the form of a cam surface or may have the form of a part of a spiral surface in order to provide the most favorable gripping surface curve for the particular application.

Although in the case of an elongated lathe tool with a single cutter plate it may be satisfactory to provide a clamping screw for a perforated cutter plate fitting into the tool body at an axis slanted with respect to the axis of the cutter plate perforation without provision for an engagement including a line contact approximately parallel to the cutter hole axis (i.e. the generatrices of the gripping surfaces) and without the eccentric character of the gripping surface of the clamping element that permits tightening or release with only a fraction of a turn, yet in the case of rotary milling tools having many cutters the time involved in replacing all the cutters of the tool makes it important to provide the eccentric feature and the higher level of vibration resulting from the operation of the rotary tool makes the provision of a gripping engagement including the generatrix line contact important.

I claim:

1. A milling tool having a support body (1), a tool seating surface (5) formed on the body on which a cutter plate insert (3) is seated, said cutter plate being pierced by a hole (4), said tool comprising:
    two positioning surfaces (6, 7) provided on the body for respectively positioning two edges of said cutter plate (1), and a tapped bore (14) formed in said body extending from the seating surface (5) in a direction inclined at an angle other than 90° with respect to both said positioning surfaces (6, 7) and the seating surface;
    a removable gripping element (12) having a threaded cylindrical shaft portion (13, 18) threaded into the tapped bore (14) in said body (1) and a gripping head (19) having a gripping surface (20) formed at the outer end thereof, which gripping surface is eccentric with respect to the longitudinal axis (15) of the cylindrical shaft portion of the gripping element (12) for tightening the cutter chip (1) against said seating surface (5) and said positioning surfaces (6, 7) on the body, the gripping surface (20) being shaped to fit the inclination of the inner wall of said hole (4) of said cutter (3) with respect to the axis of the gripping element (12) due to the inclination, in two directions, of the tapped bore (14), and engaging said inner wall at a particular pressure location (21) within the circumferential dimension of said hole.

2. A milling tool as defined in claim 1 in which said gripping surface (20) of said gripping element (12) is formed, in the neighborhood of said pressure location (21), by, a straight line generatrix approaching the cutter plate directed at least approximately parallel to the generatrix of said inner hole wall passing through said pressure location (21).

3. A milling tool as defined in claim 2 in which said gripping surface (20) of said gripping element (12) is a conical surface.

4. A milling tool as defined in claim 2 in which said gripping surface (20) of said gripping element (12) is a segment of a conical surface limited in the circumferential direction.

5. A milling tool as defined in claim 1 in which said gripping head (19a) is connected with said shaft portion (13, 18) by a neck portion (24) of smaller diameter.

6. A milling tool as defined in claim 1 in which said gripping head (19) has means for engaging a tightening tool, located in the region of its free end.

7. A milling tool as defined in claim 1 in which said shaft portion (18) has means for engaging a tightening tool, located in the region of its free end.

8. A milling tool as defined in claim 1 in which said gripping head (19) is of a cross-section having circular symmetry and in which the maximum diameter of said gripping head is smaller than the diameter of said hole (4) of the corresponding one of said cutter plates (3).

9. A milling tool as defined in claim 8 in which said gripping head (19) has a region of smaller diameter (22) adjacent the portion bearing the gripping surface (20), which region of smaller diameter has a free end surface in which are provided means for engaging a tightening tool.

10. A milling tool as defined in claim 9 in which said region of smaller diameter (22) is of frusto-conical shape.

11. A milling tool as defined in claim 1 in which said gripping surface (20) has a curvature in the shape of a portion of a spiral.

12. A milling tool as defined in claim 1 in which said gripping surface (20) has a cam curvature.

* * * * *